United States Patent [19]
Ishikawa

[11] Patent Number: 5,868,428
[45] Date of Patent: Feb. 9, 1999

[54] STRUCTURE FOR MOUNTING A CANISTER FOR REDUCING TRANSMISSION OF VIBRATION GENERATED IN A WHEEL TO THE CANISTER

[75] Inventor: Takashi Ishikawa, Okazaki, Japan

[73] Assignee: Toyota Jidosha Kabushiki Kaisha, Aichi-Ken, Japan

[21] Appl. No.: 548,401

[22] Filed: Oct. 26, 1995

[30] Foreign Application Priority Data

Nov. 21, 1994 [JP] Japan .................................... 6-286855

[51] Int. Cl.⁶ ..................................................... B60K 15/00
[52] U.S. Cl. .......................... 280/834; 55/385.3; 123/519
[58] Field of Search .................................. 280/830, 834, 280/781, 785; 123/468, 519; 55/385.3

[56] References Cited

U.S. PATENT DOCUMENTS

| | | |
|---|---|---|
| 3,752,135 | 8/1973 | Petersen et al. . |
| 4,714,172 | 12/1987 | Morris . |
| 4,727,955 | 3/1988 | Honda et al. . |
| 4,787,643 | 11/1988 | Shirata . |
| 4,793,839 | 12/1988 | Hayashida et al. ..................... 55/385.3 |
| 4,805,581 | 2/1989 | Yamada et al. . |
| 4,815,436 | 3/1989 | Sasaki et al. . |
| 4,852,761 | 8/1989 | Turner et al. .................... 123/519 R X |
| 5,060,620 | 10/1991 | Oslapas . |
| 5,111,900 | 5/1992 | Leitermann . |
| 5,381,871 | 1/1995 | Ohta ..................................... 280/834 X |
| 5,427,076 | 6/1995 | Kobayashi et al. . |

FOREIGN PATENT DOCUMENTS

| | | |
|---|---|---|
| 0 035 739 A1 | 9/1981 | European Pat. Off. ............... 280/834 |
| 588 729-A1 | 3/1994 | European Pat. Off. . |
| 41 40 090 A 1 | 6/1993 | Germany ............................... 280/834 |
| 52-63514 | 5/1977 | Japan . |
| 58-220951 | 12/1983 | Japan . |
| 61-120617 | 7/1986 | Japan . |
| 63-104223 | 7/1988 | Japan . |
| 63-119419 | 8/1988 | Japan . |

*Primary Examiner*—Anne Marie Boehler
*Attorney, Agent, or Firm*—Kenyon & Kenyon

[57] ABSTRACT

A structure for mounting a canister to an automobile wherein transmission of vibration generated by a wheel is reduced so as to prevent adsorbing agents in the canister from being worn. Wheels are mounted to left and right side members via respective suspensions. A cross member is connected between the left and right side members. The container, which accommodates adsorbing agents, is mounted to the cross member in the center between the left and right side members.

7 Claims, 5 Drawing Sheets

STRUCTURE FOR MOUNTING A CANISTER FOR REDUCING TRANSMISSION OF VIBRATION GENERATED IN A WHEEL TO THE CANISTER

BACKGROUND OF THE INVENTION

1) Field of the Invention

The present invention relates to a structure for mounting a canister to an automobile. The canister accommodates adsorbing agents for adsorbing evaporative fuel generated in a fuel tank and, more particularly, to a structure for mounting the canister. The structure reduces transmission of vibration generated in a wheel of the automobile to the canister.

2) Description of the Related Art

In an automobile having an internal combustion engine using gasoline, an evaporative fuel collecting system is used to collect evaporative fuel generated in a fuel tank. The evaporative fuel collecting system is provided with a canister which accommodates adsorbing agents such as activated carbon. The activated carbon adsorbs the evaporative fuel introduced into the canister. Accordingly, the evaporative fuel is prevented from being emitted to atmosphere.

The canister is preferably mounted near the fuel tank so that an operation for connecting tubing between the fuel tank and the canister is easily performed. Such a structure for mounting the canister is disclosed, for example, in Japanese Laid-Open Utility Model Application No. 63-119419. In this structure, the fuel tank is positioned between rear side members provided on opposite sides of the automobile. The canister is mounted to one of the rear side members at a position adjacent to the fuel tank.

When the canister is mounted to a rear side member as mentioned above, vibration generated in a wheel on the side where the canister is mounted is transmitted to the canister via the vehicle suspension and the rear side member. In this case, the grain-like adsorbing agents such as grains of activated carbon are agitated in the canister. This causes the grains of activated. Carbon to rub against to each other, resulting in wearing of the grains of activated carbon. Very small particles are produced by the wearing of the grains of activated carbon. The particles produced by the wearing of the grains of activated carbon may flow into a device such as a solenoid valve provided downstream of the canister. Accordingly, there is a problem in that normal operation of the solenoid valve is not performed due to the small particles accumulating inside the solenoid valve.

Due to the wearing of the grains of activated carbon, the net amount of activated carbon accommodated in the canister is reduced. This results in lesser amount of evaporative fuel being collected in the canister. Additionally, if an open space is formed in the canister due to the wearing of the grains of activated carbon, the evaporative fuel introduced into the canister may directly flow through the canister without being adsorbed into activated carbon. This causes a problem in which the collection efficiency of the evaporative fuel is remarkably decreased.

SUMMARY OF THE INVENTION

It is a general object of the present invention to provide an improved and useful structure for mounting a canister in which structure the above-mentioned problems are eliminated.

A more specific object of the present invention is to provide a structure for mounting a canister in which transmission of vibration generated in a wheel is reduced so as to prevent adsorbing agents in the canister from being worn.

In order to achieve the above mentioned objects, there is provided according to the present invention a structure for mounting a canister to an automobile, a frame of the automobile having left and right side members to which wheels are mounted via respective suspensions, the canister accommodating adsorbing agents which adsorb evaporative fuel generated in a fuel tank of the automobile, the structure comprising:

a cross member connected between the left and right side members; and means for mounting the canister to the cross member, the canister being positioned substantially in the center between the left and right side members.

The center of the cross member is a position most apart or substantially equidistant from both of left and right side wheels. Thus, where the transmission of vibration generated in the left and right wheels is concerned, the center of the cross member is the most appropriate position. In the present invention, since the canister is mounted in the center of the cross member, the canister is vibrated far less than when the canister is mounted to one of the left and right side members.

Due to the reduction in transmission of vibration, the rubbing of the adsorbing agents caused by the vibration is prevented. Thus, the wearing of the adsorbing agents, forming a number of small particles, is prevented. Accordingly, the small particles of the absorbing agents do not accumulate in a device positioned downstream of the canister. Accordingly, normal operation of the device is maintained for a long service time.

Additionally, since the wearing of the adsorbing agents is prevented, a decrease in the amount of evaporative fuel to be adsorbed due to the wearing no longer exists. Thus, a sufficient amount of the evaporative fuel is adsorbed by the adsorbing agents without passing through the canister. This ensures a long service life of the adsorbing agents.

In one embodiment of the present invention, a frame member is provided between the left and right side members directly under the cross member. The canister is mounted in a space between the cross member and the frame member. Accordingly, the canister is protected by the cross member and the frame member.

In one embodiment of the present invention, the means for mounting comprises at least one bracket which extends from the canister. The bracket is securely fastened to a bottom surface of the cross member by a bolt. The bracket is attached to a container of the canister which accommodates the adsorbing agents. The bracket may be integrally formed with a container of the canister.

The cross member may be a member for reinforcing the frame of the automobile which is provided between the fuel tank and a tire well which houses a spare tire.

Additionally, the cross member may be provided on a rear side of an engine of the automobile. Air flowing around the engine during a movement of the automobile passes around the canister. This air is heated by the engine, and thus the canister is heated by the air. Accordingly, the evaporative fuel adsorbed by the adsorbing agents in the canister is easily released therefrom. This helps an appropriate purging of the fuel adsorbed by the adsorbing agents. Thus, deterioration of the adsorbing agents is prevented and the service life of the adsorbing agents is further elongated.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to FIG. 1, of an evaporative fuel collecting system to which a structure for mounting a canister, which structure is according to the present invention, is related.

Figure 1:
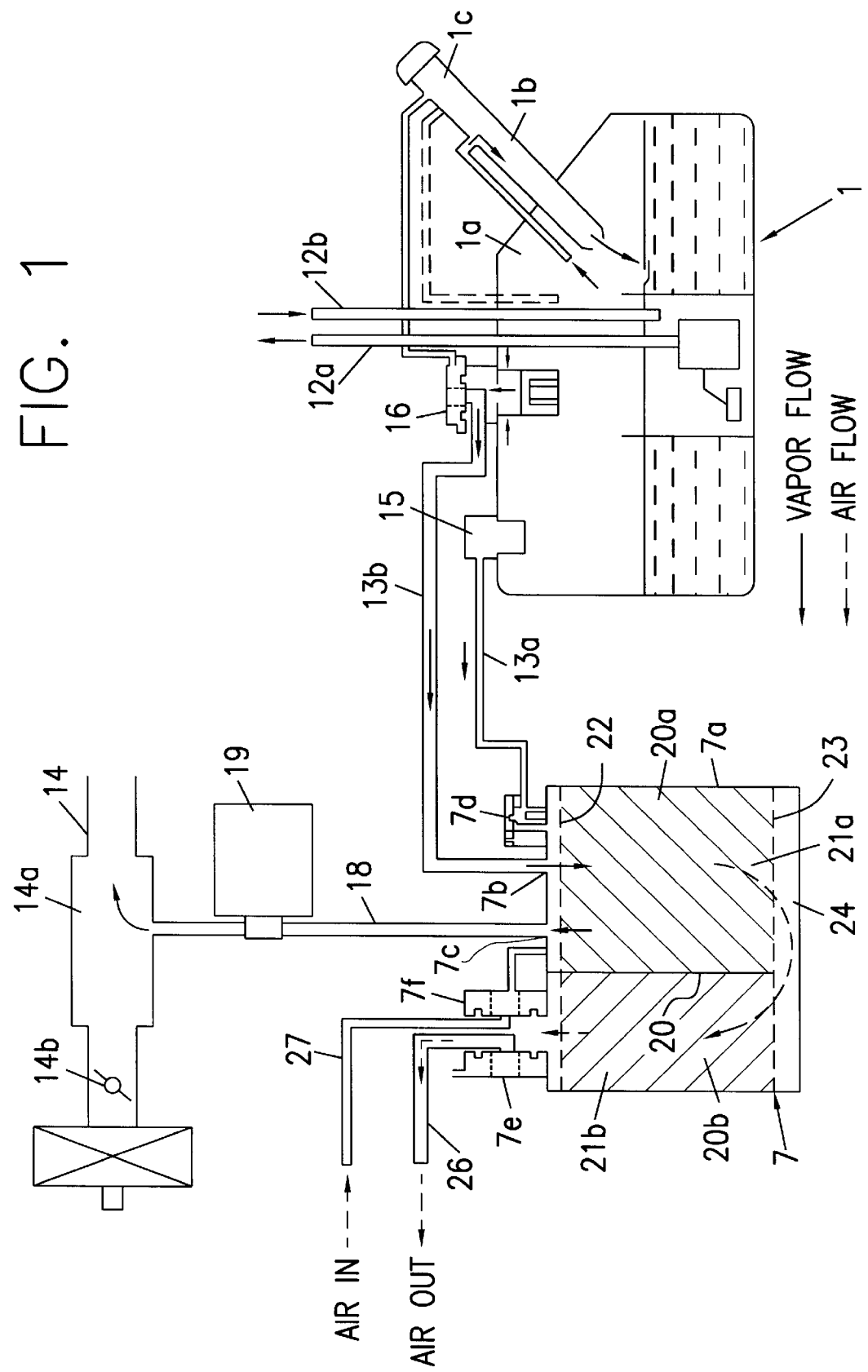
FIG. 1 is an illustration of an evaporative fuel collecting system to which a structure for mounting a canister is related.

As shown in FIG. 1, the evaporative fuel collecting system generally comprises a fuel tank 1 for storing fuel and a canister 7 for collecting the evaporative fuel generated in the fuel tank 1. A fuel supply pipe 12a and a fuel return pipe 12b are connected to the fuel tank 1. The fuel supply pipe 12a is connected to a fuel pump, a fuel filter and a pressure regulator (not shown in the figure) which together function to perform a fuel injecting operation.

The fuel tank 1 is connected to the canister 7 by a purge pipe 13a and a purge pipe 13b. The purge pipe 13a is provided for introducing the evaporative fuel in the fuel tank 1 when an engine which receives fuel from the fuel tank 1 is operated. Hereinafter, the purge pipe 13a is referred to as an evapo-purge pipe. The purge pipe 13b is provided for introducing the evaporative fuel to the canister when the fuel is filled into the fuel tank 1. The purge pipe 13b is hereinafter referred to as a filling purge pipe.

One end of the evapo-purge pipe 13a is connected to an space of the fuel tank 1 via a float valve 15 which closes when the fuel level is raised. The other end of the evapo-purge pipe 13a is connected to the canister 7 via an internal pressure controlling valve 7d. The internal pressure controlling valve 7d opens only when the pressure inside the fuel tank 1 is below a predetermined level so that excessive pressure is not introduced into the canister 7.

One end of the filling purge pipe 13b is connected to an upper space 1a of the fuel tank 1 via a pressure differential valve 16 which opens according to the difference between the pressure in the filling pipe 1b and the pressure in the fuel tank 1 when the fuel is filling the fuel tank 1. The other end of the filling purge pipe 13b is connected to a connector 7b of the canister 7. The pressure differential valve 16 opens so as to introduce the evaporative fuel into the canister 7 due to a pressure increase when fuel is being filled or introduced in the fuel tank 1 by the insertion of a fuel filling nozzle through a fuel filling opening 1c of a fuel filling pipe 1b.

A canister purge pipe 18 connects a connector 7c of the canister 7 to a surge tank 14a of an air intake pipe 14. The canister purge pipe 18 is provided with a negative pressure switching valve 19 (hereinafter referred to as VSV) comprising a solenoid valve. The evaporative fuel collected in the canister 7 is purged into the air intake pipe 14 when the VSV 19 is open. This improves fuel consumption rate and prevents the canister 7 from overflowing.

The canister 7 comprises a canister container 7a. The interior of the canister container 7a is divided into two chambers by a separation wall 20, one being a first chamber 20a and the other being a second chamber 20b. Both of the first chamber 20a and the second chamber 20b are filled with adsorbing agents 21a and 21b, respectively. The evapo-purge pipe 13a and the filling purge pipe 13b are connected to the first chamber 20a which is positioned on the upstream side. An air outlet valve 7e and an air inlet valve 7f are connected to the second chamber which is positioned on the downstream side.

The first chamber 20a and the second chamber 20b are provided with separation plates 22 and 23 to hold the adsorbing agents 21a and 21b therebetween. The separation plates 22 and 23 have a number of small diameter holes which are smaller than the diameter of the grain of the adsorbing agents 21a and 21b.

The evaporative fuel introduced into the canister 7 via the evapo-purge pipe 13a or the filling purge pipe 13b enters first into the first chamber 20a. A part of the evaporative fuel is thus adsorbed by the adsorbing agents 21a. The evaporative fuel which is not adsorbed in the first chamber 20a flows into the second chamber 20b via a connecting chamber 24 formed on the bottom of the canister 7, and is adsorbed by the adsorbing agents 21b.

The evaporative fuel collected in the first chamber 20a is released from the adsorbing agents 21a when a negative pressure is introduced due to an opening of the VSV 19 provided to the canister purge pipe 18. The evaporative fuel is then purged into the surge tank 14a via the canister purge pipe 18.

The air outlet valve 7e connected to an upper portion of the second chamber 20b opens when pressure inside the second chamber 20b exceeds a predetermined pressure. Thus, air from which the evaporative fuel is removed due to the passage through the second chamber 20b is outlet to atmosphere via an air outlet valve 26 when the air outlet valve 7e is open. On the other hand, the air inlet valve 7f opens when the pressure inside the second chamber decreases to less than a predetermined pressure. Thus, atmospheric air is introduced into the second chamber 20b via an air inlet pipe 27 when the air inlet valve is open.

Figure 2:
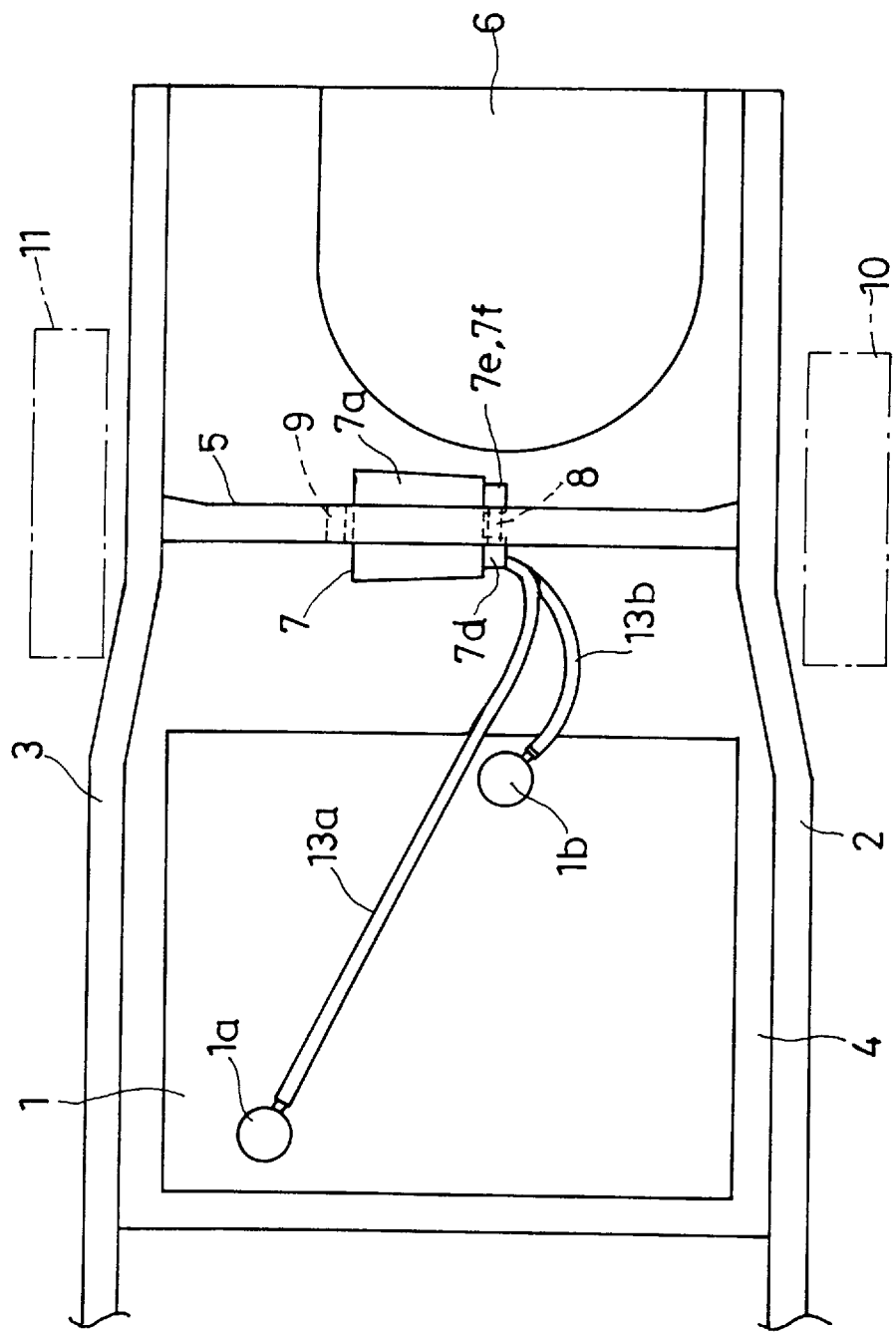
FIG. 2 is a plan view of a structure for mounting a canister which structure is according to an embodiment of the present invention.
Figure 3:
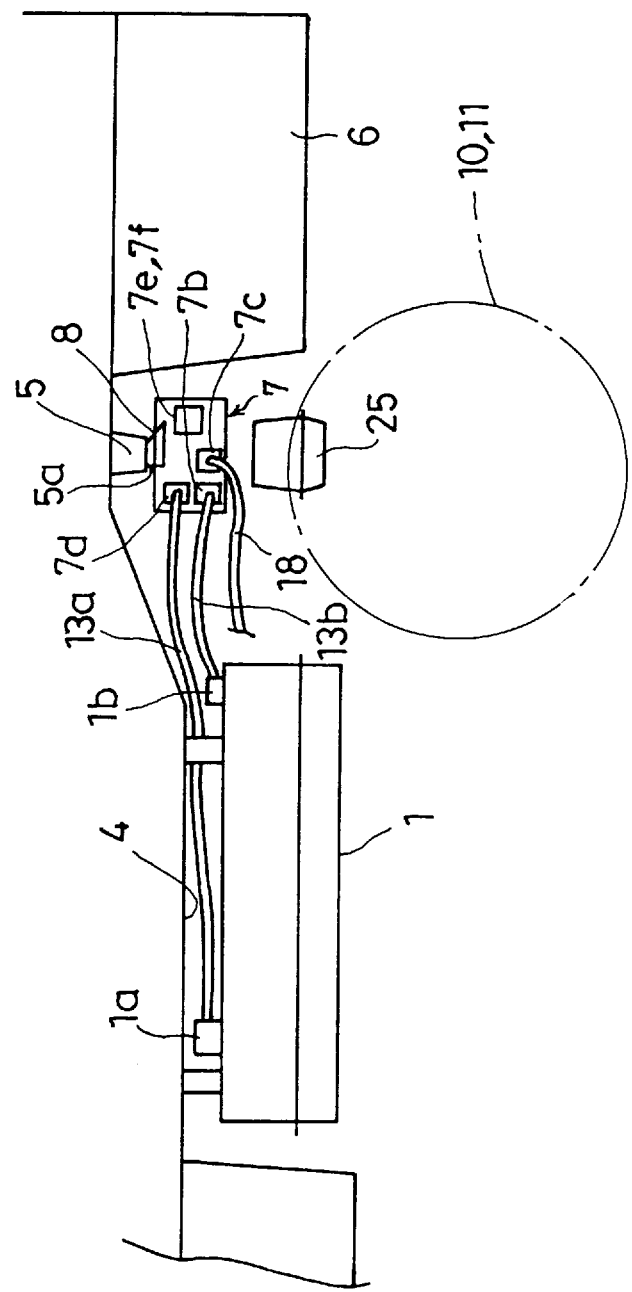
FIG. 3 is a side view of the structure for mounting a canister shown in FIG. 2.
Figure 4:
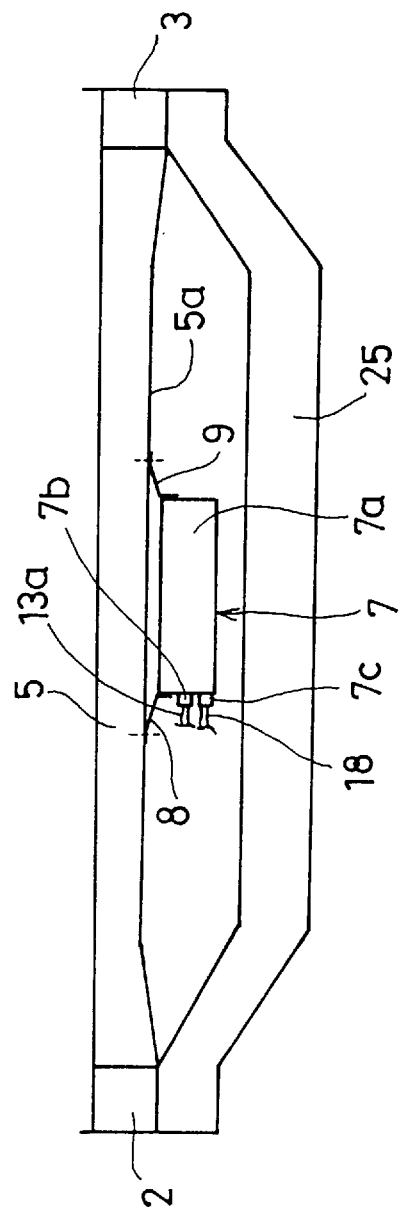
FIG. 4 is a rear side view of the structure for mounting a canister shown in FIG. 2.

A description will now be given, with reference to FIGS. 2, 3 and 4, of an embodiment of the present invention. FIG. 2 is a plan view of a structure for mounting the canister according to an embodiment of the present invention. FIG. 3 is a side view of the structure for mounting the canister shown in FIG. 2. FIG. 4 is a rear view of the structure for mounting the canister shown in FIG. 2. In FIGS. 2, 3 and 4, parts that are the same as shown in FIG. 1 are given the same reference numerals, and descriptions thereof will be omitted.

In the present embodiment, the fuel tank 1 is provided on a bottom plate 4 between rear side members 2 and 3 extending in a longitudinal direction of the associated automobile. A rear cross member 5 is bridged between the rear cross members 2 and 3 adjacent to and behind the fuel tank 1. The rear cross member 5 is positioned between the fuel tank 1 and a spare tire accommodating portion 6 which accommodates a spare tire (not shown in the figures). The rear cross member 5 is a reinforcing member of sufficient strength which connects the rear side members 2 and 3.

The canister 7 is positioned in the center of the rear cross member 5. In the present embodiment, the top portion of the canister 7, to which the pipes connecting the canister 7 to the fuel tank 1, is positioned as shown in FIG. 1 in a direction toward a side of the automobile.

Figure 5:
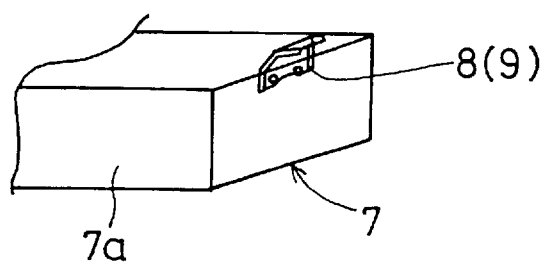
FIG. 5 is a perspective view of a bracket mounted on the canister.

The canister 7 is mounted to a bottom surface 5a of the rear cross member 5 by securely fastening brackets 8 and 9 to the rear member 5 using appropriate fastening means such as bolts, respectively. The brackets 8 and 9 have an L-shape and are attached on the opposite sides of the canister container 7a, respectively as shown in FIGS. 4 and 5. As mentioned above, the canister 7 is securely mounted on the bottom surface 5a of the rear cross member 5 without play.

Additionally, a rear sub frame 25 is bridged between the rear side members 2 and 3 at a position directly under the rear cross member 5 as shown in FIG. 4. The canister 7 is positioned in a space between the rear cross member 5 and the rear sub frame 25. Accordingly, the canister 7 is protected by the rear cross member 5 and the rear sub frame 25.

In this embodiment, rear wheels 10 and 11 are supported on the rear side members 2 and 3 via suspensions (not shown in the figures), respectively, as indicated by chain lines in FIG. 3. When the rear wheels 10 and 11 are bounced while the automobile is moving, a vibration is transmitted to the rear side members 2 and 3. The center of the rear cross member is a position most apart, i.e., substantially equivalent, from both of the rear wheels 10 and 11. Thus, where the transmission of vibration generated in the rear wheels 10 and 11 is concerned, the center of the rear cross member 5 is the most appropriate position. In the present embodiment, since the canister 7 is mounted in the center of the rear cross member 5, the canister 7 is vibrated far less than in a case where the canister 7 is mounted to one of the rear side members 2 and 3.

Due to the reduction in transmission of vibration, the rubbing of the adsorbing agents 21a and 21b caused by the vibration is prevented. Thus, the wearing of the adsorbing agents 21a and 21b, which forms a number of small particles, is prevented. Accordingly, small particles of the adsorbing agents 21a are not accumulated in the VSV 19. Therefore, normal operation of the VSV 19 is maintained for a long service time.

Additionally, since the wearing of the adsorbing agents 21a and 21b is prevented, there is no decrease in the amount of evaporative fuel adsorbed by the wearing of the grains of the adsorbing agents. Thus, a sufficient amount of the evaporative fuel is adsorbed by the adsorbing agents 21a and 21b. This ensures a long service life of the adsorbing agents 21a and 21b in the canister 7.

Further, air flowing around an engine provided on the front side of the automobile, during a movement of the automobile, passes around the canister 7. This air is heated by the engine, and thus the canister 7 is heated by the air. Accordingly, the evaporative fuel adsorbed by the adsorbing agents 21a and 21b is easily released therefrom. This helps an appropriate purging of the fuel adsorbed by the adsorbing agents 21a and 21b. Thus, deterioration of the adsorbing agents 21a and 21b is prevented and the service life of the adsorbing agents 21a and 21b is further prolonged.

Figure 6:
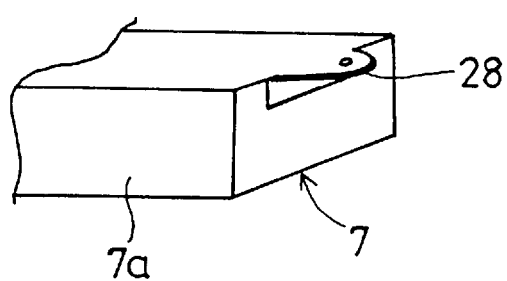
FIG. 6 is a perspective view of a bracket which is integrally formed with a housing of the canister.

In the above-mentioned embodiment, the brackets 8 and 9 are attached to the canister container 7a. In an alternative, brackets 28 may be integrally formed with the canister container 7a, as shown in FIG. 6, so as to reduce the process of attaching the brackets 28. Additionally, the brackets 8 and 9 may be secured to the rear cross member 5 via insulation rubber material so as to further reduce transmission of the vibration to the canister 7.

The present invention is not limited to the specifically disclosed embodiments, and variations and modifications may be made without departing from the scope of the present invention.

What is claimed is:

1. An automobile comprising:

a frame having left and right side members to which wheels are mounted via respective suspensions;

a cross member extending beneath a floor of the automobile, the cross member being connected between the left and right side members, and wherein the cross member is a reinforcing member for reinforcing the frame of the automobile; and a canister accommodating adsorbing agents which adsorb evaporative fuel generated in a fuel tank of the automobile, wherein the canister is directly mounted to the cross member substantially midway between the left and right side members and wherein the canister is mounted to the crossmember separated from a fuel tank of the automobile.

2. The automobile as claimed in claim 1, wherein a frame member is connected between the left and right side members directly under the cross member, and wherein a space is defined between the cross member and the frame member and the canister is located in the space.

3. The automobile as claimed in claim 1, wherein at least one bracket extends from the canister, and wherein the at least one bracket is securely fastened to a bottom surface of the cross member by at least one bolt.

4. The automobile as claimed in claim 3, wherein the at least one bracket is attached to a container of the canister, the container accommodating the adsorbing agents.

5. The automobile as claimed in claim 3, wherein the at least one bracket is integrally formed with a container of the canister, the container accommodating the adsorbing agents.

6. The automobile as claimed in claim 1, wherein the cross member is provided between the fuel tank and a tire well which houses a spare tire.

7. The automobile as claimed in claim 1, wherein the cross member is provided on a rear side of an engine of the automobile.

* * * * *